United States Patent
Unuma et al.

(10) Patent No.: US 10,234,360 B2
(45) Date of Patent: Mar. 19, 2019

(54) DEVICE DEGRADATION CAUSE ESTIMATION METHOD AND DEVICE

(71) Applicant: HITACHI, LTD., Tokyo (JP)

(72) Inventors: Munetoshi Unuma, Tokyo (JP); Takashi Saeki, Tokyo (JP); Shinya Yuda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 40 days.

(21) Appl. No.: 15/328,676

(22) PCT Filed: Jul. 30, 2014

(86) PCT No.: PCT/JP2014/069990
§ 371 (c)(1),
(2) Date: Jan. 24, 2017

(87) PCT Pub. No.: WO2016/016956
PCT Pub. Date: Feb. 4, 2016

(65) Prior Publication Data
US 2017/0212012 A1    Jul. 27, 2017

(51) Int. Cl.
*G01M 17/007* (2006.01)
*B60W 50/00* (2006.01)
*G05B 23/02* (2006.01)
*G07C 5/08* (2006.01)

(52) U.S. Cl.
CPC .......... *G01M 17/007* (2013.01); *B60W 50/00* (2013.01); *G05B 23/0227* (2013.01); *G05B 23/0275* (2013.01); *G07C 5/08* (2013.01)

(58) Field of Classification Search
CPC ............................ G01M 17/007; G01M 99/00
See application file for complete search history.

(56) References Cited

U.S. PATENT DOCUMENTS

| | | | |
|---|---|---|---|
| 6,541,285 B2* | 4/2003 | Koike | G01R 31/287 257/E21.525 |
| 8,699,606 B2* | 4/2014 | Rezk | H04B 7/0413 375/267 |
| 2010/0057292 A1 | 3/2010 | Ishikawa et al. | |
| 2014/0379310 A1* | 12/2014 | Ramachandran | G06Q 30/0202 703/2 |

FOREIGN PATENT DOCUMENTS

| | | |
|---|---|---|
| JP | 2010-055545 A | 3/2010 |
| JP | 2013-079920 A | 5/2013 |
| JP | 2014-107676 A | 6/2014 |
| WO | 2014/102918 A1 | 7/2014 |

* cited by examiner

*Primary Examiner* — Elias Desta
(74) *Attorney, Agent, or Firm* — Volpe and Koenig, P.C.

(57) ABSTRACT

A degradation cause estimation device is provided with a degradation detector for detecting the amount of degradation undergone by a device, a state observation device for detecting observation values for internal portions, values observed from outside, or device control and operation information, a degradation section detector for detecting a section undergoing degradation using the output values of the degradation detector, and a cause estimator for estimating the cause of the degradation using the device state observations for the degradation section, and outputs the cause for the degradation section.

10 Claims, 10 Drawing Sheets

HISTOGRAM OF DEGRADATION IN CERTAIN TYPE TEST

[Fig. 15]

COMPARISON BETWEEN TYPE TEST AND ACTUAL SITE

DEVICE DEGRADATION CAUSE ESTIMATION METHOD AND DEVICE

TECHNICAL FIELD

The present invention relates to a method of estimating a cause of degradation which a running device undergoes, and the device.

BACKGROUND ART

As a related technology of the present technology field, PTL 1 discloses a vehicle fatigue damage diagnosis system in which the degree of fatigue damage of members or portions of a vehicle is estimated such that maintenance of the members or the portions of the vehicle can be appropriately performed. Moreover, paragraph [0086] of the specification discloses that "the large amount of input data as the damage factor other than damage caused due to fatigue can be displayed or output together with the degree D of the fatigue damage associated with the traveling condition data of the vehicle 1". In other words, description is given regarding a technology in which the degree D of fatigue damage, the large amount of input data as the damage factor other than fatigue damage, and the traveling condition data (for example, conditions of a transmission such as selected gear, engine torque, and engine speed) are displayed and output by being associated with each other.

CITATION LIST

Patent Literature

PTL 1: JP-A-2013-79920

SUMMARY OF INVENTION

Technical Problem

An object of the present invention is to provide a means for detecting the amount of degradation which a running device undergoes, for example, in PTL 1, the degree of fatigue damage occurring due to repetitive stress, to provide a means for estimating a cause thereof on the basis of information from sensors within or outside the device or device control and operation information, and to specify the cause of device degradation.

PTL 1 discloses that a means for detecting a degree of fatigue damage which is one of the amounts of degradation; information from the sensors within the device, such as conditions of a transmission of a vehicle and engine torque; and the device operation information are displayed and output so as to be associated with each other. Therefore, the degree of fatigue damage, the information from the sensors, and the device operation information are displayed by being contrasted with each other.

However, there is no disclosure regarding which sensor value or which type of operation affects the degradation (fatigue damage). Furthermore, there is no disclosure regarding a means for recognizing environmental conditions, an operational state, or the like in which a machine is located, and estimating the cause of degradation (fatigue damage), based on multiple types of sensors, control, and operation information.

Solution to Problem

In order to solve the above-described problems, according to the present invention, a device degradation cause estimation device includes a degradation detection means for detecting an amount of degradation which the device undergoes; a device state observation means for detecting an observation value of an internal portion of the device, an observation value obtained from the outside, and device control and operation information; a degradation section detection means for detecting a section undergoing degradation beyond the degree of an output value of the degradation detection means; and a cause estimation means for estimating a cause of degradation by applying a device state observation performed in a degradation section. The cause in the degradation section is output.

In addition, in the device degradation cause estimation device according to the present invention, the degradation section is a section of time in which the amount of degradation appears to be an amount equal to or greater than a predetermined threshold value, or a spatial movement path.

In addition, in the device degradation cause estimation device according to the present invention, the degradation section is a section of wavelengths of a degradation amplitude extracted through a cycle counting method subjected to element separation.

In addition, in the device degradation cause estimation device according to the present invention, a frequency distribution of the amount of degradation is prepared for each cause, and a generation distribution of the amount of degradation is displayed for each cause.

In addition, in the device degradation cause estimation device according to the present invention, an amount of a factor of degradation occurring during an endurance test of the product is prepared so as to be in a frequency distribution similar to the frequency distribution of the cause, or prepared validity of the factor of degradation in the type test is evaluated.

In order to solve the above-described problems, according to the present invention, a device degradation cause estimation method includes detecting an amount of degradation which the device undergoes; detecting an observation value of an internal portion of the device, an observation value obtained from the outside, and device control and operation information; detecting a degradation section undergoing degradation beyond the degree of an output value of the amount of degradation which the device undergoes; and estimating a cause of degradation by applying a device state observation performed in the degradation section. The cause in the section undergoing degradation is output.

In addition, in the device degradation cause estimation method according to the present invention, the degradation section is a section of time in which the amount of degradation appears to be an amount equal to or greater than a predetermined threshold value, or a spatial movement path.

In addition, in the device degradation cause estimation method according to the present invention, the degradation section is a section of wavelengths of a degradation amplitude extracted through a cycle counting method subjected to element separation.

In addition, in the device degradation cause estimation method according to the present invention, a frequency distribution of the amount of degradation is prepared for each cause, and a generation distribution of the amount of degradation is displayed for each cause.

In addition, in the device degradation cause estimation method according to the present invention, an amount of a factor of degradation occurring during an endurance test of the product is prepared so as to be in a frequency distribution similar to the frequency distribution of the cause, or, prepared validity of the factor of degradation in the endurance test is evaluated.

Advantageous Effects of Invention

According to the present invention, it is possible to realize estimation regarding which sensor value or which type of operation affects degradation (fatigue damage).

In addition, it is possible to realize estimation regarding recognition of environmental conditions, an operational state, or the like in which a machine is located, and estimation of the cause of degradation (fatigue damage), based on multiple types of sensors, control, and operation information.

DESCRIPTION OF EMBODIMENTS

Hereinafter, Examples of the present invention will be described by using the drawings.

Example 1

In the present Example, description will be given regarding a device which estimates a cause of device degradation and displays or outputs a result thereof.

Figure 1:
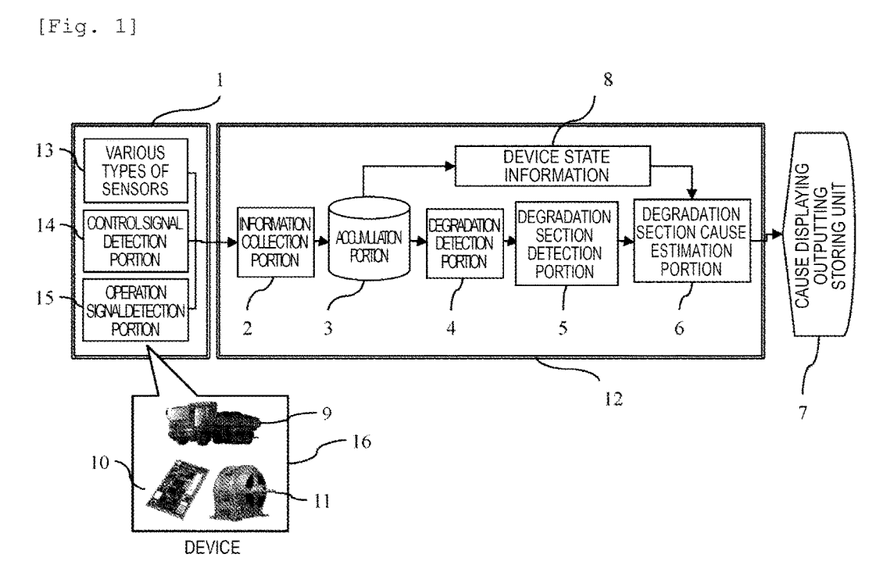
FIG. 1 is a configuration diagram of a device degradation cause estimation device according to Example of the present invention.

FIG. 1 is a configuration diagram of a device degradation cause estimation device according to the present Example.

An information detection unit 1 collects information of a degradation factor estimation target obtained from sensors within or outside a device 16, and device control and operation information. As examples of the device 16, a vehicle 9, an electric motor device 11, and a circuit substrate 10 are illustrated. However, the invention is not limited to these devices.

The information detection unit 1 is configured to have various types of sensors 13, a control signal detection portion 14, an operation signal detection portion 15, and the like.

The various types of sensors 13 are sensors which detect the inside of the device (each of components and portions) or conditions of the externality. As a positional example of internal sensors, in the example of the vehicle 9, there are an engine speed sensor, a coolant temperature sensor, a vehicle speed sensor, an oil pressure sensor, an acceleration sensor and a strain sensor which are attached to a vehicle body, and the like. As externality sensors, there are a camera (an externality sensor using an image) which captures an image of the outside from the vehicle 9, and a road surface temperature sensor which is installed on a traveling road, and information of meteorological data such as the amount of rainfall and the wind speed in the vicinity of the position of the vehicle may be detected via a network.

The control signal detection portion 14 receives a control signal for controlling the device. In the example of the vehicle 9, the control signal is a received signal such as a control signal for changing the reduction gear ratio of an automatic transmission, a signal for opening and closing a radiator valve, and a signal controlling the operation of the device by using a controller or a threshold value of a sensor value.

The operation signal detection portion 15 detects an operation signal in a case where an operator (a person or a control device controlling the operation of the device) performs an operation the device. In the example of the vehicle 9, an operation angle of steering, the amount of opening and closing a throttle valve, the amount of operating a brake pedal, and the like are the operation signals.

The information of a signal detected by the information detection unit 1 is collected by an information collection portion 2. In the information collection portion 2, when the various types of sensors 13 are analog sensors, analog data is sampled and is converted into digital data by using an A/D converter which is built in the information collection portion 2. When information from the various types of sensors 13, the control signal detection portion 14, and the operation signal detection portion 15 flows in an in-car network such as a CAN, necessary information is cut out from the information flowing in the CAN. For the information from the information detection unit 1 to the information collection portion 2, in addition to cable communication such as an analog signal and the CAN line, a communication means using radio communication, an internet line, or a mobile phone network may be applied.

A cause estimation computation unit 12 in FIG. 1 performs computation of device degradation cause estimation. In the processing block, the information collection portion 2, an accumulation portion 3, a degradation detection portion 4, a degradation section detection portions, a degradation section cause estimation portion 6, and device state information 8 are depicted. However, all of the elements can be processed by one computation processing device (for example, a personal computer), or the processing may be performed by the independent computation processing device for each of the blocks and a processing result may be transmitted by using a cable communication means or a radio communication means.

Regarding the cause estimation computation unit 12, an overview for each of the processing blocks will be described below, and the processing will be described in detail thereafter.

Information collected by the information collection portion 2 is accumulated in the accumulation portion 3. The accumulation portion 3 is a configuration block which is necessary in a case where time series data collected by the information collection portion 2 in the degradation section cause estimation portion 6 from the degradation detection computation portion 4 is required to be accumulated in a certain time section. In a case of sequential processing which requires no time accumulation section, the accumulation portion 3 is not essential.

The degradation detection portion 4 detects the amount of degradation by using the accumulated data of the information accumulation portion 3. In a case of detecting fatigue degradation (fatigue damage) occurring due to a repetitive stress, detection is performed by adopting a cycle counting method of detecting the repetitive stress. In a case of insulation degradation or degradation of a semiconductor element, detection is performed by setting a threshold value to the amount of an applied voltage or the temperature of an insulating material.

The degradation section detection portion 5 detects a time section undergoing degradation. In a case of fatigue degradation, the section undergoing degradation indicates a section from the start time to the end time of one repetitive stress. In a case of the insulation degradation or the degradation of a semiconductor element, the section undergoing degradation indicates a time section having a time at which the applied voltage or temperature exceeds the threshold value is set as the start time and a time at which the value drops lower than the threshold value is set as the end time.

The degradation section cause estimation portion 6 performs the estimation processing of the cause of degradation while having the degradation section in which the device state information 8 stored in the information accumulation portion 3 is detected by the degradation section detection portion 5, as reference information.

An estimated result is displayed and output by using a means for displaying and outputting a cause and a storage unit 7.

Next, the estimation processing in FIG. 2 will be described in detail by using a processing flow.

(1) Processing Step 20

The device state information regarding the sensors, controlling, operations, and the environment of the device is collected by using the information detection unit 1 in FIG. 1.

(2) Processing Step 21

Time information is accumulated in the accumulation portion 3 in FIG. 1 so as to be associated with the collected information. When the collected information is associated with the time information, the collected information can be compared with other types of collected information or can be associated with the degradation section.

(3) Processing Step 22 and Processing Step 23

Figure 3:
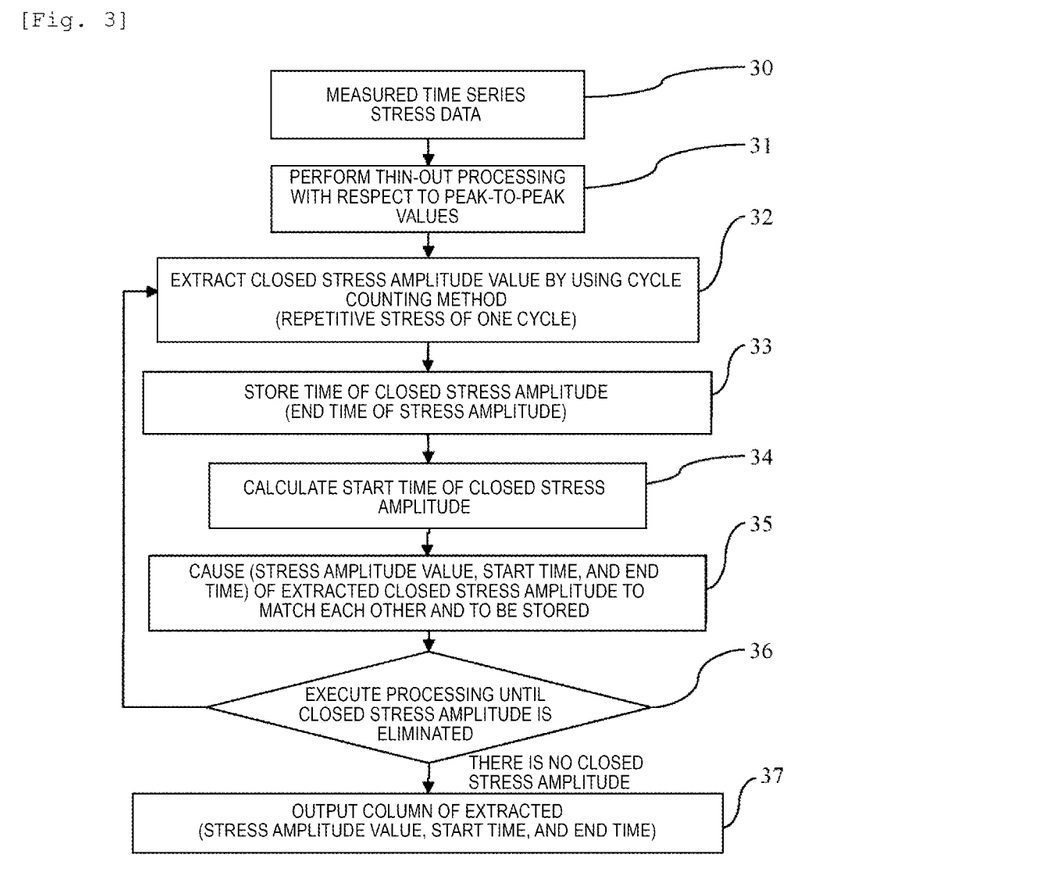
FIG. 3 illustrates a processing flow, according to Example of the present invention.

The amount of degradation which the device undergoes is detected by using the device state information related to the detection of degradation, and the time section (the degradation section) in which the device undergoes degradation is detected. Regarding the processing of processing steps 22 and 23, a processing flow in a case of having fatigue degradation as an example will be described by using FIG. 3. FIG. 3 describes a procedure for detecting the time section of fatigue degradation by applying a rain flow method which is utilized in order to extract the repetitive stress from a waveform of a stress.

First, in data (measured time series stress data 30) which is sampled by the various types of sensors (stress related sensors) 13 and to which the time information is applied, thin-out processing 31 with respect to peak-to-peak values is performed.

Figure 4:
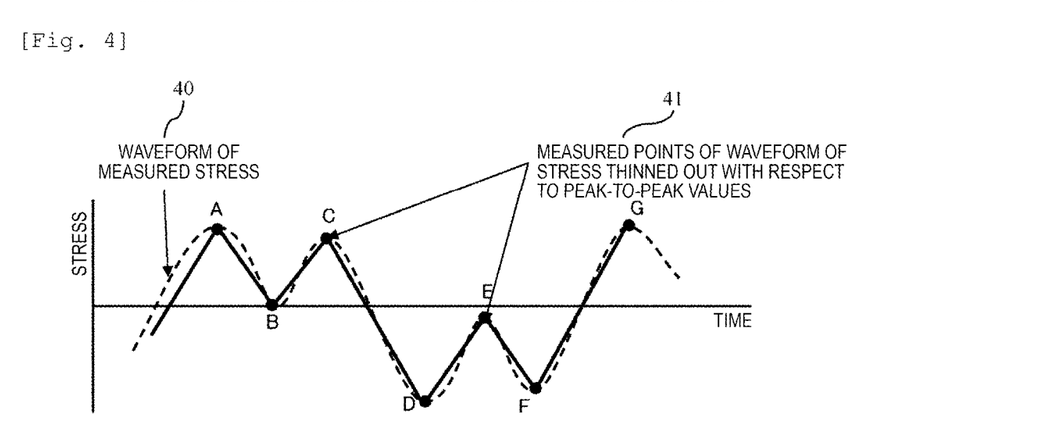
FIG. 4 illustrates a relationship between waveforms of a stress measured in Example of the present invention, and the stress after being thinned out to peak-to-peak values.

FIG. 4 illustrates a relationship between the measured waveform of a stress and the stress after being thinned out to the peak-to-peak values. In FIG. 4, the curved line depicted with the dotted line indicates a measured waveform 40 of a stress, and the points A, B, C, D, E, F, and G indicate the peak-to-peak values 41. The peak-to-peak values are extremal values indicating the maximal value or the minimal value of the measured data. The amount of fatigue damage depends on a stress range which is a difference between the maximal value and the minimal value of the waveform of the stress, and does not depend much on the time taken for being changed from the maximal value to the minimal value. Therefore, the stress values of a peak-to-peak value A and the peak-to-peak value B in FIG. 4 and the difference therebetween become important, and the shape of the waveform of the stress which has changed from the peak-to-peak value A to the peak-to-peak value B is not important. Therefore, the rain flow method is performed on the assumption of using the data after being converted into the peak-to-peak value data. Here, in the processing 31, the thin-out processing with respect to the peak-to-peak values is performed.

In processing step 32, extraction processing of a closed stress amplitude value is performed by using the rain flow method.

Figure 5:
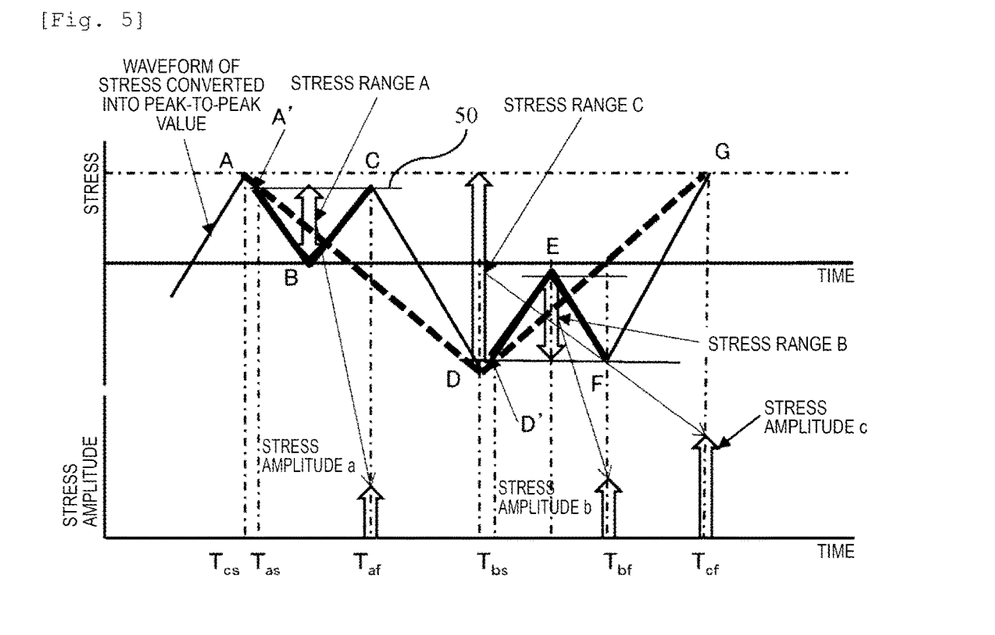
FIG. 5 illustrates a method of extracting a stress amplitude value, according to Example of the present invention.

FIG. 5 illustrates a method of extracting the stress amplitude value. The top half of FIG. 5 illustrates the waveform of the stress converted into the peak-to-peak value, and the bottom half of FIG. 5 indicates the extracted stress amplitude. In the rain flow method, in a case where the value of a peak-to-peak value C is smaller than the peak-to-peak value A, the difference between the peak-to-peak values B and C is set as the closed stress amplitude, and the stress difference between the peak-to-peak values B and C is set as the stress range or half thereof is set as the stress amplitude, thereby extracting and outputting a result. The closed stress denotes a stress change in which the stress value at the start point of the stress change and the stress value at the end point are equal to each other. The fatigue damage occurring due to the closed stress amplitude is fatigue damage of one cycle. The peak-to-peak values B and C are deleted from the list of the peak-to-peak values at the time of outputting, and the processing continues while having the waveform of the stress of the peak-to-peak value in a form of A-D-E-D-G. In other words, the closed stress amplitude extracted herein becomes A'-B-C.

In a processing step 33 of storing a time of the closed stress amplitude, a time $T_{af}$ of the peak-to-peak value C which is the final value of the stress amplitude is stored. Accordingly, the end time of the stress amplitude is determined.

Next, in processing 34, the start time of the closed stress amplitude is calculated. The start time is A'. However, A' is not a peak-to-peak value and is a closed stress. Accordingly, the stress value of A' is the same value as the peak-to-peak value C. Here, as indicated with a line 50 from the peakto-peak value C, a start time $T_{as}$ can be obtained by drawing an equivalent stress line and obtaining the intersection point between the equivalent stress line and the straight line connecting the peak-to-peak values A and B. In a case of using a calculated start time, since there is a case where it may be difficult to be associated with the condition information described below, the closest measurement time in the time series stress data 30 measured before being thinned out to the peak-to-peak values may be set to $T_{as}$.

In a processing step 35, the pieces of information (a stress amplitude value a, the start time $T_{as}$, and the end time $T_{af}$) of the extracted closed stress amplitude are associated with each other and are stored.

The processing from the processing step 32 to a processing step 36 is executed until the closed stress amplitude is eliminated, and a column {in this Example, the stress amplitudes a, b, and c, and the times are associated therewith} extracted in a processing step 37 (the stress amplitude value, the start time, and the end time) is output.

Figure 6:
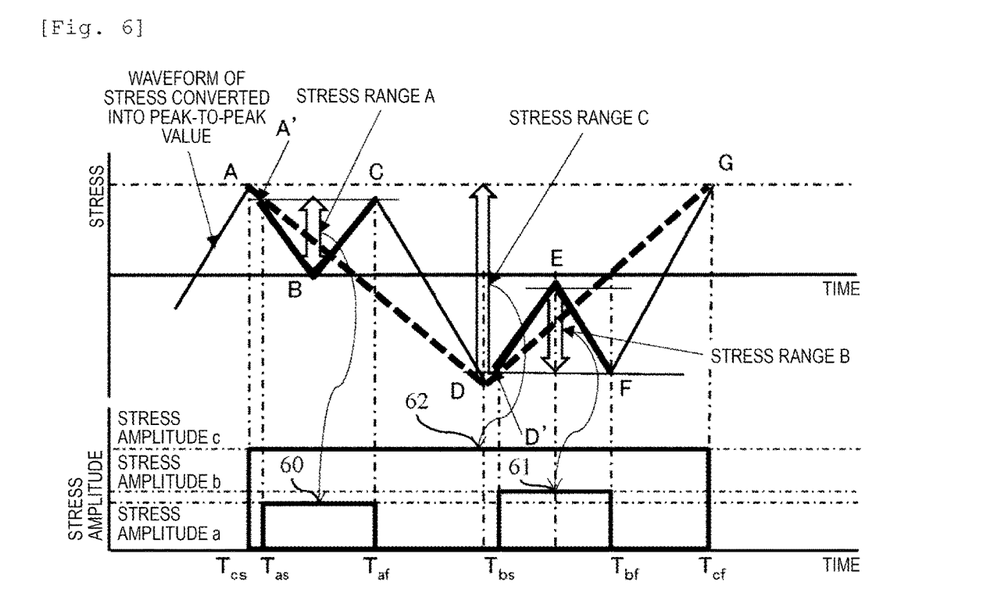
FIG. 6 is a view depicting a start time and an end time of a stress amplitude, according to Example of the present invention.

FIG. 6 is a view depicting the start time and the end time of the stress amplitude. The stress amplitude A'-B-C is indicated by using a rectangle 60 formed by the start point and the end point of the time and the stress amplitude a. According to FIG. 6, it is possible to know that the generation range of the stress amplitude can be detected.

In this manner, the time section of fatigue degradation is detected. The detected result may be temporarily stored in a database or the like.

(4) Processing Step 24

The estimation processing of the cause of degradation in the degradation section is performed by using the device state information.

Figure 7:
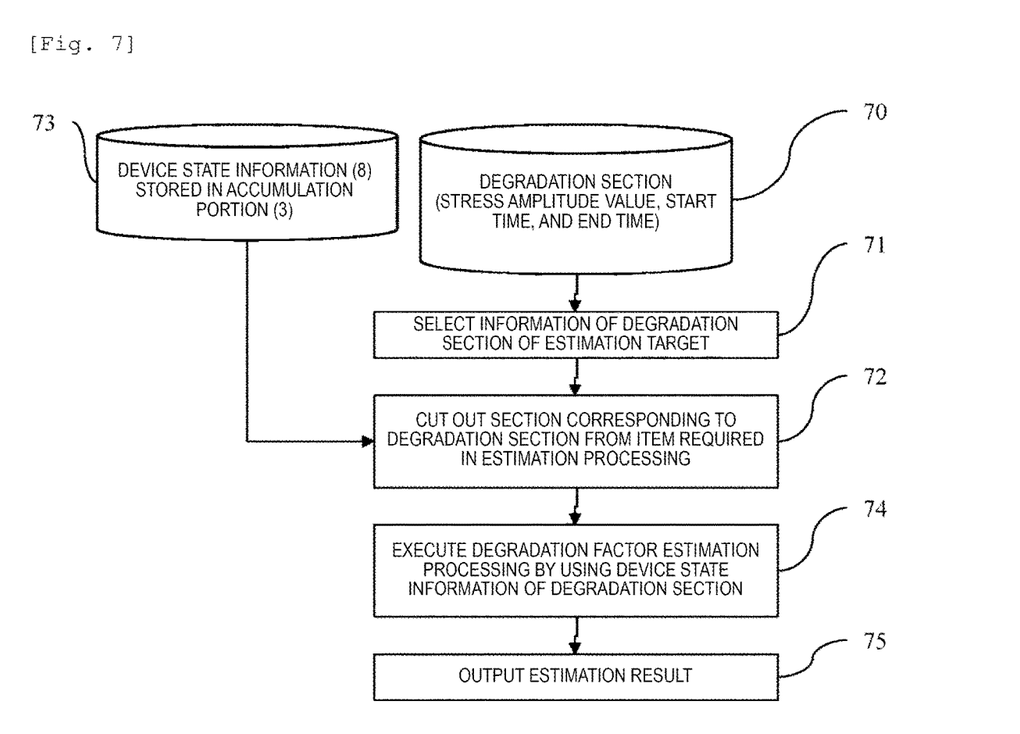
FIG. 7 illustrates a processing flow of estimation processing of a cause of degradation, according to Example of the present invention.

FIG. 7 illustrates a processing flow of the estimation processing of the cause of degradation.

Figure 8:
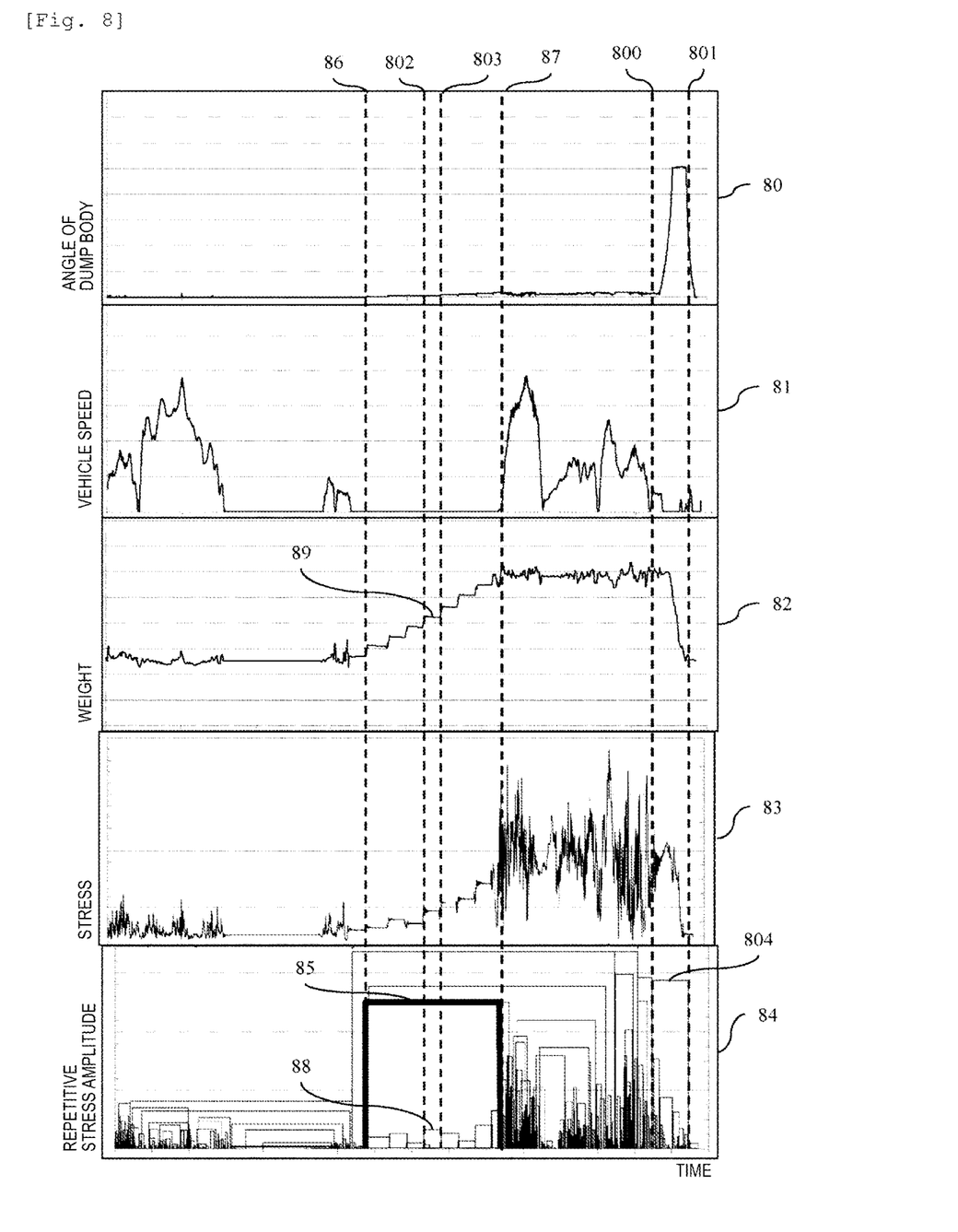
FIG. 8 is a contrast view of an elapsed time, a repetitive stress amplitude, and data from each of sensors, according to Example.

A storage device 70 stores the fatigue degradation section output in the processing step 37 in FIG. 3. A storage device 73 stores the device state information 8 stored in the accumulation portion 3. FIG. 8 illustrates an example of a dump truck as examples of the storage device 70 and the storage device 73. The section before a time 86 is a section in which the dump truck moves with an empty load. The section from the time 86 to a time 87 is a section in which the dump truck is loaded with soil by using an excavator. The section from the time 87 to a time 800 is a section in which the dump truck moves in the loaded condition. The section from the time 800 to a time 801 is a section in which a dump body is lifted and the loaded soil is dumped. A graph 80 indicates an angle of the dump body (an angle of the dump body lifted in order to dump the soil). A graph 81 indicates the vehicle speed of the dump truck. A graph 82 indicates the weight of the dump truck including the load. A graph 83 indicates an output of the strain sensor attached to a certain portion of the dump truck. A graph 84 indicates the stress value of the repetitive stress extracted from the output of the strain sensor by using the technique in FIG. 3, and the section (the degradation section) thereof.

Therefore, in a case of the example of FIG. 8, the storage device 70 stores the information of the repetitive stress and the degradation section of the graph 84, and the storage device 73 stores the information of the graph 80, the graph 81, and the graph 82.

In a processing step 71, the degradation section which is an estimation target is selected. For example, a graph 85 of FIG. 8 is one of the degradation sections, and a user may select the graph 85 portion by using a mouse pointer or the like, or a computation device performing processing of multiple degradation sections accumulated in the storage device 70 may sequentially select the graph 85 portion.

In a processing step 72, a section corresponding to the degradation section is cut out from the item required in the estimation processing in the device state information of the storage device 73. In the example of FIG. 8, since the selected graph 85 is a degradation section having the time 86 as the start point and the time 87 as the end point, the graph 80, the graph 81, and the graph 82 are cut out at the section from the time 86 to the time 87.

In a processing step 74, the degradation factor estimation processing is executed by using the device state information of the degradation section. Various types of processing can be considered as the degradation factor estimation processing. For example, it is possible to consider a technique in which a sensor value having the greatest amount of change within the section is extracted and a cause postulated in a case where such a phenomenon occurs is tied up, and it is possible to consider various types of techniques such as a technique in which a cause postulated in a case where multiple values of the sensor value are included within values set in advance, and in a case where such a phenomenon occurs is tied up. In the present Example, the estimation technique itself is not restricted, and an optimal estimation technique is selected in accordance with the estimated item.

In the example of FIG. 8, the amount of change is significant in the section from the time 86 to the time 87 of the graph 80, the graph 81, and the graph 82 due to a weight change of the graph 82. In a case where the weight change is significant and the inclination of the change is in an increasing direction, when the condition is tied up as "being loaded", the degradation section of the graph 85 can be estimated as one repetitive stress which the vehicle body undergoes due to the weight change occurring during the time period from the start to the end of loading. In addition, when association is also performed with respect to the amount of the weight change, and the amount of change of the degradation section is a value close to the loading limit of the dump truck, the value can be estimated as the weight change occurring during the time period from the start to the end of loading. When the amount of change of the degradation section is a value close to the amount of one bucket of the excavator, the value can be estimated as the stress change occurring due to the load of one bucket. In the example of FIG. 8, the sensor of which the amount of change becomes significant in the same time section as a degradation section 88 is included in a graph 89 indicating the weight of the graph 82, and this can be estimated as degradation occurring due to the stress change in accordance with the weight change in response to the load by one bucket.

In addition, in a degradation section 804 as another example, the value significantly changes in the graph 80 and the graph 82. In the graph 80, the dump body is lifted (the angle is widened). Thereafter, the lifting is cancelled and the dump body returns to the original position (returns to the horizontal posture). In addition, the vehicle weight has changed from the loaded condition to the empty load condition. Therefore, in a case where there is such a change of the sensor, when the condition is tied up as "soil dumping", the cause of degradation of the degradation section 804 can be estimated as degradation occurring due to one repetitive stress in accordance with the weight change in response to "soil dumping".

In the present Example, the degradation section is extracted by using the technique of FIG. 3, and the estimation processing of the cause is performed by being limited to the time section thereof. Accordingly, the processing specialized for the estimation section can be performed. Therefore, it is possible to expect an estimation result with high accuracy despite of simple estimation processing.

(5) Processing Step 25

In this manner, the estimated result is output in a processing step 75.

Figure 2:
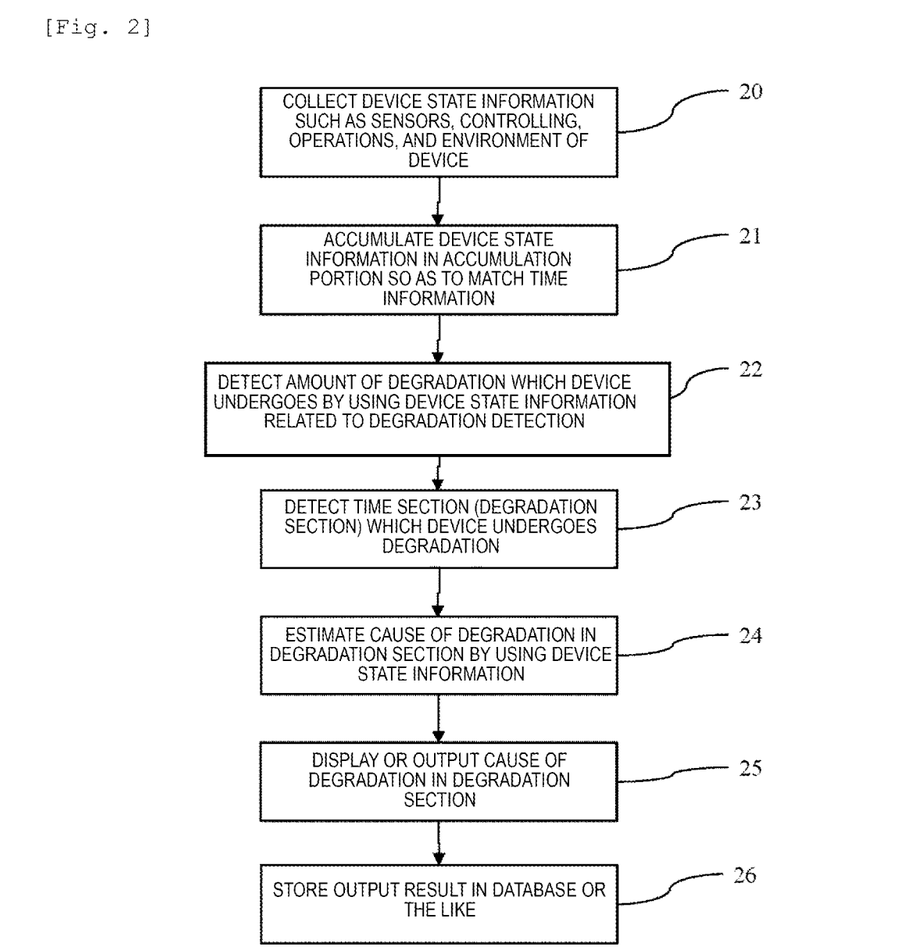
FIG. 2 is a processing block diagram of estimation processing according to Example of the present invention.

In addition, regarding the estimated result, the cause of degradation in the degradation section is displayed or output in a processing step 25 of FIG. 2.

(6) Processing Step 26

The output result is stored in the database or the like in a processing step 26.

Last, according to the cause displaying outputting storing unit 7 in FIG. 1, the results output in the processing step 75 and the processing step 25 are displayed on a screen or output for other types of processing.

According to the present Example, the cause of the degradation section can be estimated.

Example 2

In the present Example, a display example according to the cause displaying outputting storing unit 7 in FIG. 1 will be described.

Figure 9:
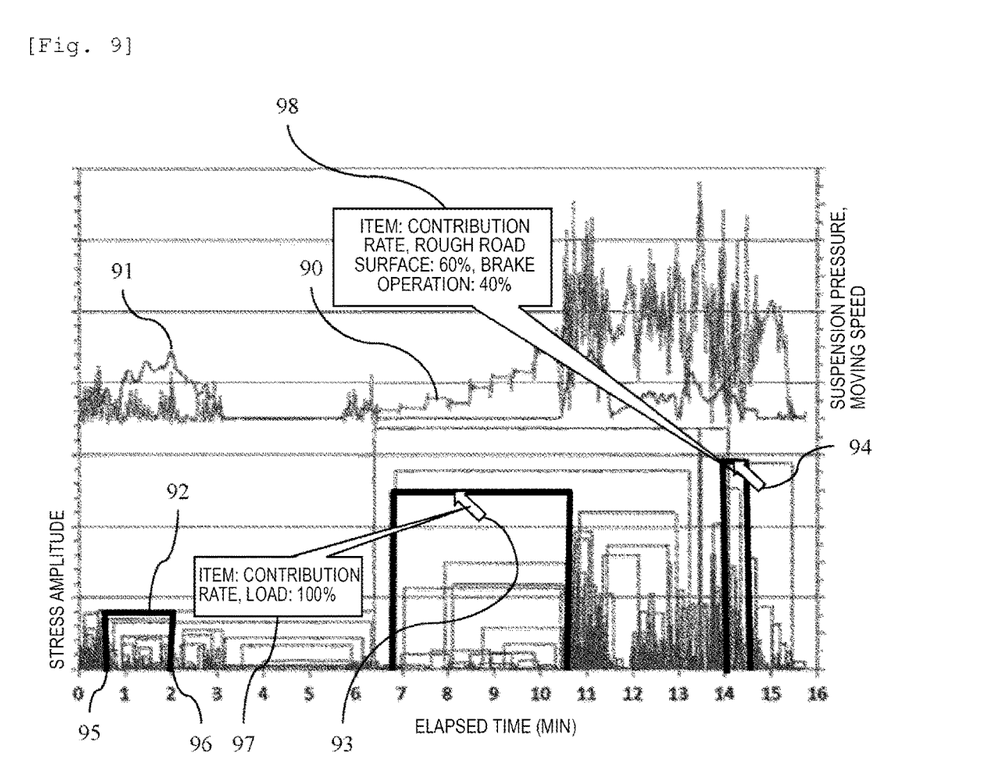
FIG. 9 is a contrast view of the elapsed time, the stress amplitude, and the data from each of the sensors, according to Example.

FIG. 9 illustrates a display example in which the time series data is applied. The horizontal axis of FIG. 9 indicates an elapsed time, and the top half of FIG. 9 indicates suspension pressure and a moving speed of a vehicle, that is, a moving speed 91 of the vehicle and a pressure change 90 of a suspension. The bottom half indicates the amount of degradation obtained through the processing flow of FIG. 3 (the diagram shows the stress amplitude proportional to the amount of degradation) and the degradation section. For example, a graph 92 indicates one extracted degradation section. The amount in the vertical axis direction indicates the stress amplitude value. A time 95 indicates the start time of the degradation section. A time 96 indicates the end time of the degradation section. In this manner, FIG. 9 depicts multiple degradation sections.

Example of FIG. 9 shows each of the causes in multiple degradation sections depicted therein. For example, a mouse pointer is placed at the position of a graph 93 and is clicked. Then, one of the degradation sections selected by the mouse pointer is selected and changes to a bold line display. According to this operation, the degradation section which becomes the cause target can be specified. The cause of degradation in the specified degradation section is extracted in accordance with the cause displaying outputting storing unit 7 by using a means for specifying ID information and the like. For example, the extracted result is displayed in a form of "load: 100%" by using a balloon FIG. 97. This Example shows an example in a case where the algorithm of outputting a contribution rate and the like of the cause is utilized with respect to the degradation section cause estimation portion 6. The contribution rate is a technique in which a cause in a case where a certain phenomenon occurs is not the cause of one type, and the contribution rate of the occurrence of the phenomenon is expressed through weighting performed for each cause, and is a technique which is generally utilized as a technique for a multi-variable analysis and the like. In the example of the balloon FIG. 97, the cause of the degradation section is estimated to occur due to only "load". In a case where the mouse pointer is placed at the position of a graph 94, a balloon FIG. 98 is displayed, and "rough road surface: 60%" and "brake operation: 40%" are displayed. The factor of degradation is caused due to the rough road surface and the brake operation, and it is possible to know that the contribution rates thereof are respectively 60% and 40%.

In the present Example, since the stress amplitude is extracted from the waveform of the stress, a small degradation section is extracted in a significant degradation section in a nested condition. However, in a case of performing extraction by using the threshold value of the voltage value applied in insulation degradation diagnosis, there is no such a nested condition. The degradation section can be extracted through a similar operation even though the extraction is not performed in the nested condition.

According to the present Example, even in a case where multiple degradation sections are extracted, the cause of each of the degradation sections can be determined.

Figure 10:
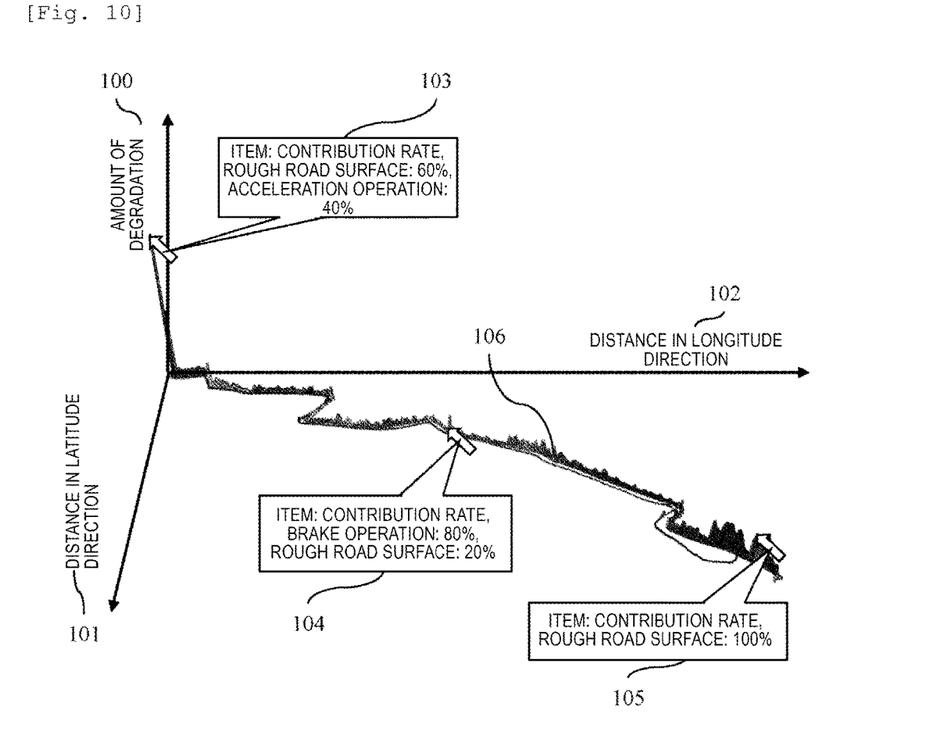
FIG. 10 illustrates a display example in which the amount of change and spatial data are applied, according to Example.

FIG. 10 illustrates a display example in which spatial data (geographical space) is applied. In the display example, an axis 102 indicates the longitude direction, an axis 101 indicates the latitude direction, and a vertical axis 100 indicates the amount of degradation. The axis 102 and the axis 101 are respectively set to the longitude direction and the latitude direction. However, expression may be performed by using a local coordinate system peculiar to a map or a drawing. A graph 106 depicts the amount of degradation on a movement path of the vehicle. FIG. 10 can be depicted by performing association of positional information (the spatial data) of the vehicle at the same time as the time series data illustrated in FIG. 9.

Balloon FIGS. 103, 104, and 105 of FIG. 10 are examples displaying the factor of degradation when the mouse pointer is clicked on the waveform of the amount of degradation similar to FIG. 9. The amount of degradation becomes significant at a certain place and the cause thereof can be displayed by operating the mouse pointer.

According to the present Example, by performing association with respect to the spatial data, the cause of degradation occurring due to the place can be determined.

Example 3

In the present Example, description will be given regarding an example of preparing a histogram of the amount of degradation for each cause by utilizing an output result in accordance with the cause displaying outputting storing unit 7 in FIG. 1.

Figure 11:
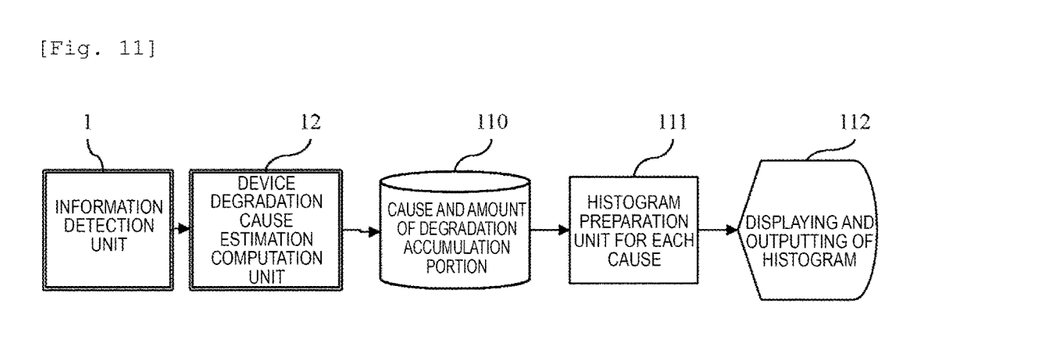
FIG. 11 illustrates a processing block of preparing a histogram of the amount of degradation for each cause, according to Example.

FIG. 11 illustrates a processing block for preparing a histogram of the amount of degradation for each cause.

The information detection unit 1 and the device degradation cause estimation unit 12 have the same configuration as those having the same reference signs described in FIG. 1.

There is provided an accumulation portion 110 of the cause and the amount of degradation. For example, in Example of FIG. 9, the amount of degradation indicates the stress amplitude value in a degradation section 93, and the cause indicates "load" estimated by an estimation processing portion.

There is provided a processing unit 111 which prepares a histogram for each cause and is a display and output portion of the histogram displaying and outputting the result thereof.

Figure 12:
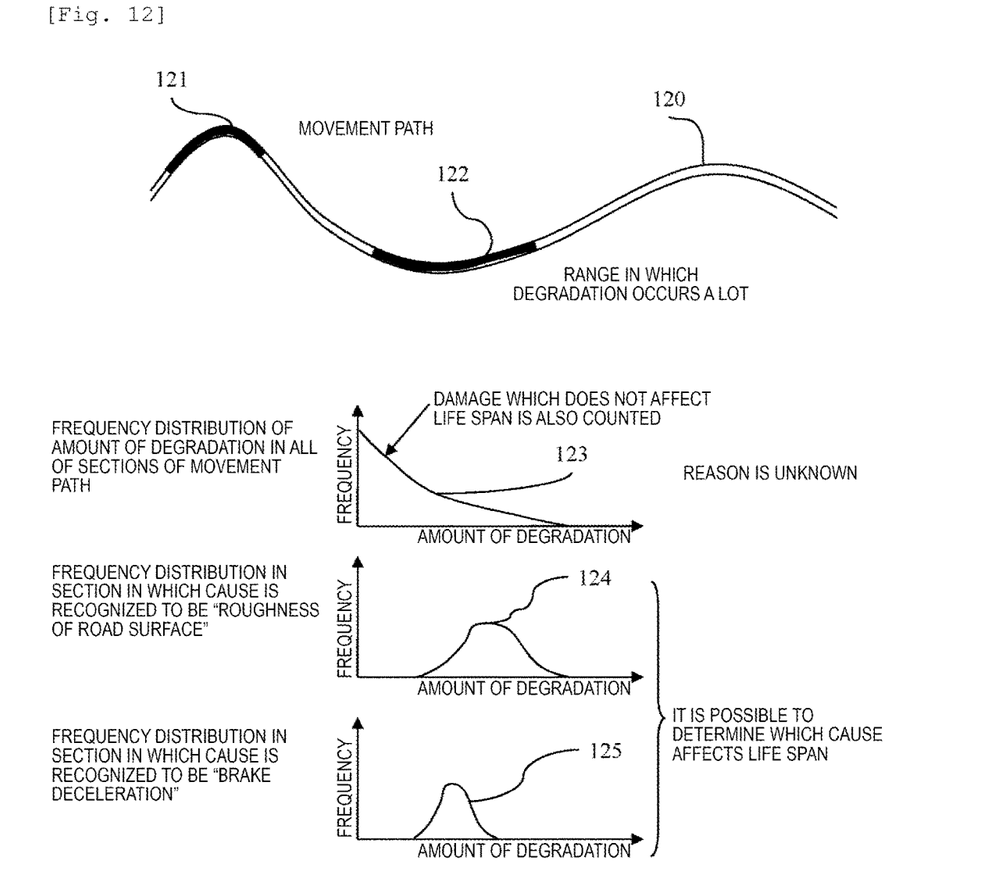
FIG. 12 illustrates degradation occurring due to a specific cause in Example, and a frequency distribution thereof.

FIG. 12 illustrates a display example after the processing. In FIG. 12, a movement path 120 of the vehicle is displayed, and there are sections 121 and 122 in the movement path 120 of the vehicle, in which degradation occurs many times.

A graph 123 indicates a frequency distribution of the amount of degradation which the vehicle undergoes in all of the sections of a movement path. On the movement path, there are sections where degradation occurs a lot and sections where degradation occurs a little. Therefore, the frequency distribution of the amount of degradation occurring in all of the sections becomes a distribution as the graph 123. In the graph 123, even though the frequency distribution of the amount of degradation which the vehicle undergoes in all of the sections is known, it is difficult to determine the reasons of the distribution and the cause.

A graph 124 and a graph 125 are results obtained by taking out degradation occurring due to a specific cause from degradation in all of the sections and by preparing the frequency distribution thereof. The graph 124 indicates that the cause is roughness of a road surface, and the graph 125 indicates that the cause is brake deceleration. In this manner, when the frequency distribution of the amount of degradation for each cause is prepared, the amount of degradation for each cause and the distribution of the generation frequency can be read. Accordingly, it is possible to know the cause of degradation which the vehicle undergoes in the movement path (the graph 124 has more frequencies of significant degradation compared to the graph 125). The factor applying significant degradation is a factor which makes the life span of the device short. A user can extend the life span of the device on the basis of the result of the display by conducting countermeasures for reducing the cause applying significant degradation (in a case of the graph 124, improvement of the road surface). In the present Example, the diagram of FIG. 12 is displayed and described such that the user visually determines the circumstances and conducts countermeasures for the factor of. However, it is possible to manufacture a device which automatically displays the cause of degradation by providing processing of automatically extracting the cause having a high frequency of significant degradation after the processing unit 111 preparing the histogram of FIG. 11.

According to the present Example, the factor of degradation affecting the life span of the device can be extracted from various types of factors of degradation which the running device receives, and thus, it is possible to extend the life span of the device by conducting countermeasures for the factor of degradation on the basis of the extracted result.

Example 4

In the present Example, description will be given regarding a device for evaluating validity of a type test of the device on the basis of the result of the histogram of the amount of degradation for each of the factors of degradation described in FIG. 11.

The type test denotes a test for evaluating and verifying whether or not the device can perform a normal operation or the device has a life span which is postulated when being designed, by using a determined operation pattern of the device. Therefore, when the operation pattern of the device reflects the actual environment of the site, the device can be precisely evaluated. In the related art, a designer postulates the environment of the site, and the operation pattern is prepared on the basis thereof. Moreover, no means for evaluating the validity the operation pattern is present. Accordingly, there is a case where the actual environment of the site is not reflected. In the present Example, description will be given regarding a device evaluating the validity of the prepared operation pattern or correcting the prepared operation pattern.

Figure 13:
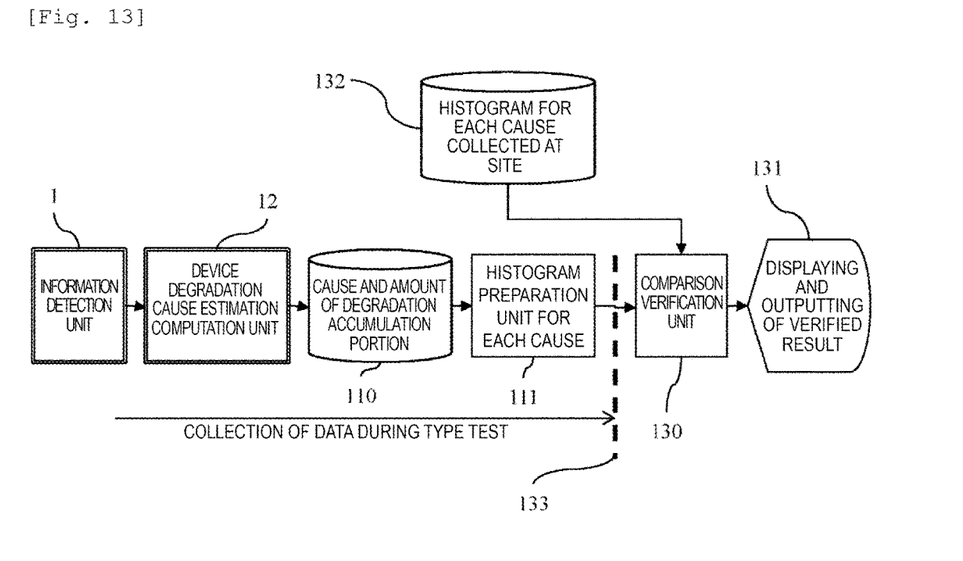
FIG. 13 is a block diagram of processing of the device evaluating a type test, according to Example.

FIG. 13 illustrates a block diagram of processing of the device evaluating the type test. In the block diagram of the processing, there is provided a database 132 in which the histogram for each cause collected at the site is accumulated. For example, the histogram for each cause collected from the devices in operation over the whole world may be accumulated, and the histograms may be accumulated by being classified for each area and the usage purpose of the device. In other words, the database 132 is data in which the usage state at the actual site is accumulated.

The processing block up to the dotted line 133 is a flow of processing the data collected from the device when the type test is performed, and the processing similar to that in Example of FIG. 11 is performed.

In a comparison verification unit 130, the histogram of test pattern items (for example: "brake operation" and "irregular ground traveling") performed in the type test, and the histogram of the cause of degradation items (in the items of FIG. 10, "brake operation" and "rough road surface") are compared to each other. When the tendency of the histogram collected in the type test and the tendency of the histogram collected in the actual site are similar to each other, the postulated contents of the test operation for the type test can be determined to be simulating the usage state at the site. When the tendencies are not similar to each other, the contents of the test operation for the type test is changed so as to be similar to each other. The state is illustrated in FIGS. 14 and 15.

Figure 14:
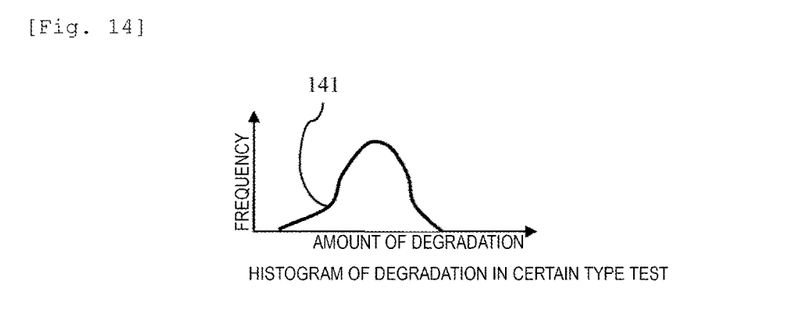
FIG. 14 is a histogram of degradation in a case where an item of the type test according to Example is executed.
Figure 15:
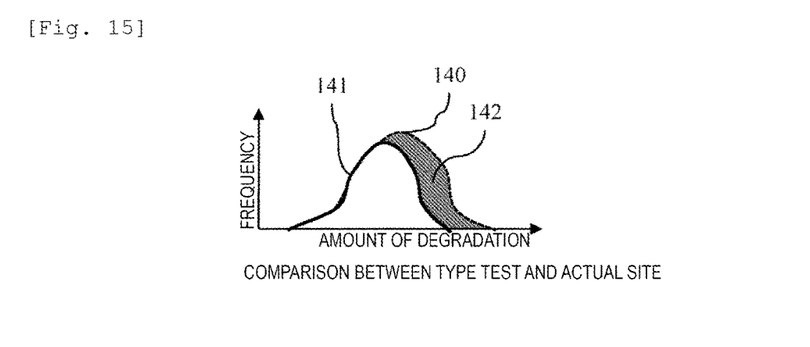
FIG. 15 is a view in which the histograms of the items of a factor of degradation overlap each other, according to Example.

FIG. 14 is a histogram of degradation in a case where an item of the type test is executed. A graph 141 indicates a certain histogram of the test item. FIG. 15 is a view in which the histogram of the item of the factor of degradation at the actual site corresponding to the type test item overlaps that in FIG. 14. A graph 140 indicates the histogram of the item of the factor of degradation at the actual site. Accordingly, it is possible to know that the actual site has a significant frequency of a portion of the large amount of degradation (a region 142 portion). For example, when the test item is "irregular ground traveling", the irregular ground road at the site is postulated to be rougher than the irregular ground traveling road utilized in the type test, and thus, it becomes clear from the result that the irregular ground traveling road utilized in the type test is required to be corrected.

The similarity comparison of the histograms may be performed by an evaluator through visual determination, or may be performed through automatic detection by providing a correlationship and similarity comparison processing unit for the waveform within the evaluation device.

According to the present Example, the validity of the type test can be evaluated.

The invention claimed is:

1. A device degradation cause estimation device comprising:
   a degradation detection unit that detects an amount of degradation which the device undergoes;
   an information detection unit including one or more sensors, operatively coupled with the degradation detection unit, that detects an observation value of an internal portion of the device, an observation value obtained from an outside of the device, and device control and operation information;
   a degradation section detection unit that detects a section undergoing degradation beyond the degree of an output value of the degradation detection means; and
   a cause estimation unit operatively coupled with the degradation section detection unit, that detects a cause of degradation by applying a device state observation performed in a degradation section, extracts degraded sections including time and space positions, and correlates corresponding degradation factors, wherein a main cause of occurrence in the degradation section is output.

2. The device degradation cause estimation device according to claim 1,
wherein the degradation section is a section of time in which the amount of degradation appears to be an amount equal to or greater than a predetermined threshold value, or a spatial movement path.

3. The device degradation cause estimation device according to claim 1,
wherein the degradation section is a section of wavelengths of a degradation amplitude extracted through a cycle counting method subjected to element separation.

4. The device degradation cause estimation device according to claim 1,
wherein a frequency distribution of the amount of degradation is prepared for each cause, and
wherein a generation distribution of the amount of degradation is displayed for each cause.

5. The device degradation cause estimation device according to claim 1,
wherein an amount of a factor of degradation occurring during an endurance test of the product is prepared so as to be in a frequency distribution similar to the frequency distribution of the cause, or wherein a prepared validity of the factor of degradation in the endurance test is evaluated.

6. A device degradation cause estimation method comprising:
detecting an amount of degradation which the device undergoes;
detecting an observation value of an internal portion of the device, an observation value obtained from an outside of the device, and device control and operation information;
detecting a degradation section undergoing degradation beyond the degree of an output value of the amount of degradation which the device undergoes;
estimating a cause of degradation by applying a device state observation performed in the degradation section;
extracting degraded sections including time and space positions; and
correlating corresponding degradation factors,
wherein a main cause of occurrence in the section undergoing degradation is output.

7. The device degradation cause estimation method according to claim 6,
wherein the degradation section is a section of time in which the amount of degradation appears to be an amount equal to or greater than a predetermined threshold value, or a spatial movement path.

8. The device degradation cause estimation method according to claim 6,
wherein the degradation section is a section of wavelengths of a degradation amplitude wherein the degradation amplitude is a stress amplitude extracted through a cycle counting method subjected to element separation.

9. The device degradation cause estimation method according to claim 6,
wherein a frequency distribution of the amount of degradation is prepared for each cause, and
wherein a generation distribution of the amount of degradation is displayed for each cause.

10. The device degradation cause estimation method according to claim 1,
wherein an amount of a factor of degradation occurring during an endurance test of the product is prepared so as to be in a frequency distribution similar to the frequency distribution of the cause, or wherein a prepared validity of the factor of degradation in the endurance test is evaluated.

* * * * *